Aug. 11, 1953 — R. W. PHILLIPS — 2,648,123
METHOD OF MAKING A HOSE END COUPLING
Filed Nov. 26, 1949
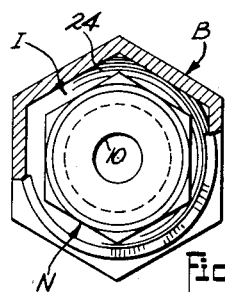
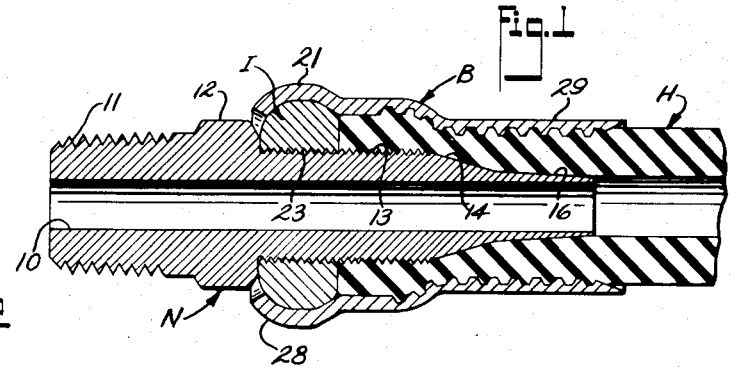
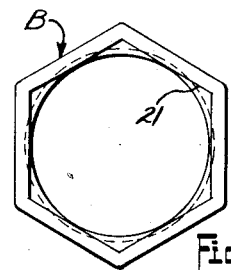
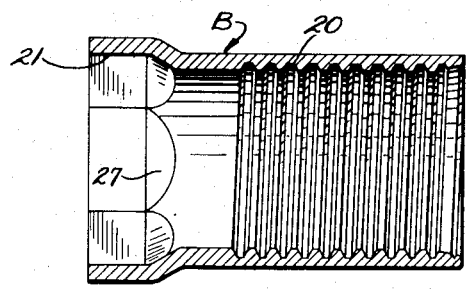
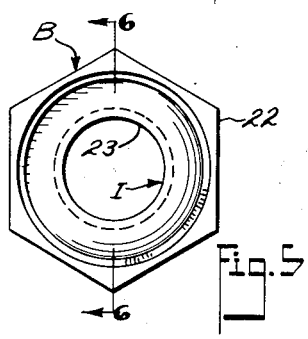
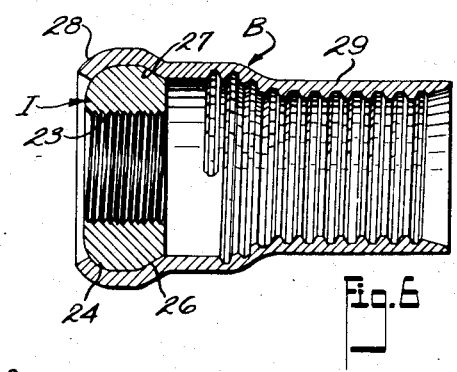
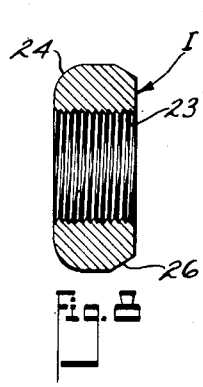
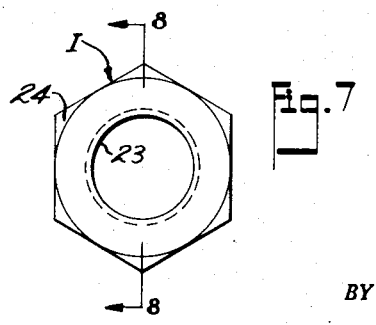
*INVENTOR.*
ROBERT W. PHILLIPS
BY
*ATTORNEYS*

Patented Aug. 11, 1953

2,648,123

UNITED STATES PATENT OFFICE 2,648,123

METHOD OF MAKING A HOSE END COUPLING

Robert W. Phillips, University Heights, Ohio, assignor to The Weatherhead Company, Cleveland, Ohio, a corporation of Ohio Application November 26, 1949, Serial No. 129,613

3 Claims. (Cl. 29—148.2)

This invention relates to hose ends and more specifically to a method of making composite hose ends of the quick-attachable type.

The principal object of the invention resides in the provision of a hose end having excellent coupling qualities with the hose which is at the same time very economical to fabricate. Briefly, this is accomplished by forming a hose end of three parts: first, a threaded nipple member, preferably formed on a screw machine; second, a tubular hose-receiving body; and third, an insert member fastened to the body and threaded to the nipple member. This permits making the hose-receiving body from welded or seamless tubing or from flat sheet metal stock. In accordance with the invention the threaded insert, which is readily made on a screw machine, is retained in the sheet metal body by a spinning operation so that the assembled body and insert are formed more economically than in prior constructions wherein the body is machined from solid bar stock and formed with internal threads to engage the nipple. Another advantage of this construction resides in the fact that the body retains its ductility without an intermediate anneal so that there is no danger of cracking or splitting of the body when it is crimped about the hose or in response to fluid pressure within the fitting.

The manner in which these and other objects are accomplished will be apparent from the following detailed description of a preferred embodiment of the invention.

In the drawings:

Fig. 1 is a longitudinal section through the hose end when assembled with the hose;

Fig. 2 is an end view thereof with part of the body shell broken away;

Fig. 3 is a longitudinal section through the body shell at an intermediate stage in its formation;

Fig. 4 is an end view thereof;

Fig. 5 is an end view of the completed body and insert assembly;

Fig. 6 is a section on 6—6 of Fig. 5;

Fig. 7 is an end view of the body insert; and

Fig. 8 is a section on 8—8 of Fig. 7.

The major elements of the completed hose end are best seen in Figs. 1 and 2. The hose end includes a nipple N, a body shell member B formed of sheet metal stock, and a separately attached insert member I attached to the body member in the completed form. Nipple N is formed with the usual hose fluid passageway 10 and has a threaded portion 11 for coupling to a suitable connector, there being a non-circular or hexagonal wrench-receiving portion 12 formed on the nipple for effecting the connection. In order to facilitate the assembly of the hose with the coupling, the nipple has a threaded portion as at 13 from which continues a tapered hose expanding portion 14 and a pilot portion 16.

The body or shell member B is preferably originally formed from seamless steel tubing although in the broader aspects of the invention it may be formed from flat metal stock. As seen in Fig. 3, the tubing is internally threaded as at 20 and one end section is expanded with a hexagonal punch to form the hexagonal end portion 21.

The insert I is formed separately, preferably from hexagonal screw machine stock, and is internally threaded as at 23 to fit threads 13 on the nipple. The insert has a rounded nose 24 and a tapered nose 26. The hexagonal periphery of the insert substantially matches the internal surface of the hexagonal portion 21 of the body B.

In assembly, the insert may be placed in position in the body B with the beveled nose 26 engaging bevels 27 formed by the aforesaid punch, whereupon the end of the body is spun over as at 28 against the rounded nose 24 on the insert to firmly retain the two parts together. The rearward portion 29 of the body B is crimped or otherwise reduced in diameter as at 29 to provide a hose clamping section.

To assemble the hose end with the hose H the hose end is first forced into the body B with the end thereof abutting the insert I. The nipple N is then inserted in the threads 23 of the insert and, by means of wrenches applied to the haxagonal peripheries of the body and the nipple, the latter may be advanced into the hose, expanding it against the body and providing a zone of reduced section at the tapered nose 14 which traps the hose against cold flow.

This construction has considerable advantages in economy of fabrication. The shell B may be completely formed without an intermediate anneal from readily-worked material such as SAE 1010 steel and there is no tendency for the shell to crack or split at the reduced portion 29. The nipple N and the insert I may be made of screw machine stock such as SAE 1113 steel, and formed on automatic screw machines which arer apid and economical fabrication devices. Only a simple spinning operation is required to assemble the machined insert in the body. The hexagonal wrench-receiving portion 21 of the body is backed up by the insert so that there is no deformation of these parts during manipulation of the hose end.

Having completed a detailed description of a preferred form of the invention it will be apparent that other forms thereof may be provided without departing from the essence of the invention as defined in the appended claims.

What is claimed is:

1. A method of making a hose end comprising the steps of forming a body insert having a threaded bore and a polygonal periphery, forming a cylindrical body member, axially pressing said cylindrical body member with respect to a polygonal punch through a distance less than half the axial extent of the member to provide one end of the member with a polygonal mouth, removing said punch and inserting said polygonal insert in said mouth having a forward face adjacent thereto, reducing the diameter of the free edge of said mouth and pressing said edge into contact with said forward face of said insert, and reducing the other end of said body member for about half the axial extent thereof providing an unreduced portion between said insert and said other end.

2. A method of making a hose end comprising the steps of forming a body insert having a threaded bore and a polygonal periphery, forming a cylindrical body member, axially pressing said cylindrical body member with respect to a polygonal punch through a distance less than half the axial extent of the member to provide one end of the member with a polygonal mouth, removing said punch and inserting said polygonal insert in said mouth having an axially rounded forward face adjacent thereto, reducing the diameter of the free edge of said mouth and pressing said edge into contact with said rounded forward face of said insert, and reducing the other end of said body member for about half the axial extent thereof providing an unreduced portion between said insert and said other end.

3. A method of making a hose end comprising the steps of machining an externally threaded nipple, forming a body insert having a threaded bore and a polygonal periphery, forming a cylindrical body member, axially pressing said cylindrical body member with respect to a polygonal punch through a distance less than half the axial extent of the member to provide one end of the member with a polygonal mouth, removing said punch and inserting said polygonal insert in said mouth having a forward face adjacent thereto, reducing the diameter of the free edge of said mouth and pressing said edge into contact with said forward face of said insert, and reducing the other end of said body member for about half the axial extent thereof providing an unreduced portion between said insert and said other end, and threading said nipple into the threaded body insert.

ROBERT W. PHILLIPS.

References Cited in the file of this patent

UNITED STATES PATENTS

| Number | Name | Date |
|---|---|---|
| 1,804,284 | Smith | May 5, 1931 |
| 1,810,268 | Dold | June 16, 1931 |
| 2,073,909 | Stecher | Mar. 16, 1937 |
| 2,167,654 | Hothersall | Aug. 1, 1939 |
| 2,333,349 | Weatherhead, Jr. | Nov. 2, 1943 |
| 2,338,666 | Nelson | Jan. 4, 1944 |
| 2,432,598 | Weatherhead, Jr. | Dec. 16, 1947 |
| 2,499,241 | Courtot | Feb. 28, 1950 |